(12) United States Patent
Orange et al.

(10) Patent No.: US 9,150,692 B2
(45) Date of Patent: Oct. 6, 2015

(54) POLYAMIDE COMPOSITION

(75) Inventors: Gilles Orange, Vourles (FR); Mathilde Mercier, Lyons (FR); Franck Touraud, Eyzin Pinet (FR); Stéphane Jeol, Lyons (FR); Roland Durand, Saint Bonnet de Mure (FR)

(73) Assignee: RHODIA OPERATIONS, Aubervilliers (FR)

( * ) Notice: Subject to any disclaimer, the term of this patent is extended or adjusted under 35 U.S.C. 154(b) by 392 days.

(21) Appl. No.: 13/383,094

(22) PCT Filed: Jun. 30, 2010

(86) PCT No.: PCT/EP2010/059271
§ 371 (c)(1),
(2), (4) Date: Mar. 26, 2012

(87) PCT Pub. No.: WO2011/003785
PCT Pub. Date: Jan. 13, 2011

(65) Prior Publication Data
US 2012/0177922 A1    Jul. 12, 2012

(30) Foreign Application Priority Data

Jul. 9, 2009 (FR) .................................... 09 54755

(51) Int. Cl.
  *C08G 63/78* (2006.01)
  *C08L 77/06* (2006.01)
  *C08G 69/48* (2006.01)
  *C08G 69/26* (2006.01)
  *C08J 3/00* (2006.01)

(52) U.S. Cl.
  CPC .............. *C08G 69/48* (2013.01); *C08G 69/265* (2013.01); *C08J 3/005* (2013.01); *C08L 77/06* (2013.01); *C08J 2377/06* (2013.01); *Y10T 428/2982* (2015.01)

(58) Field of Classification Search
  CPC ....... C08G 69/48; C08G 69/265; C08J 3/005; C08J 2377/06; C08L 77/06; Y10T 428/2982
  USPC .............. 428/402; 251/182.11; 524/445, 447, 524/449, 451, 606; 525/450; 528/206; 977/773
  See application file for complete search history.

(56) References Cited

U.S. PATENT DOCUMENTS

| | | | |
|---|---|---|---|
| 5,705,586 A * | 1/1998 | Sato et al. ........................ 528/15 |
| 6,127,514 A * | 10/2000 | Wicks et al. ................... 528/367 |
| 2009/0071697 A1* | 3/2009 | Ishikawa et al. .............. 174/254 |
| 2010/0098893 A1 | 4/2010 | Okushita et al. |

FOREIGN PATENT DOCUMENTS

WO   WO 2008/072754   6/2008

OTHER PUBLICATIONS

International Search Report (PCT/ISA/210) issued on Aug. 17, 2010, by European Patent Office as the International Searching Authority for International Application No. PCT/EP2010/059271.

* cited by examiner

*Primary Examiner* — Leszek Kiliman
(74) *Attorney, Agent, or Firm* — Dentons US LLP

(57) ABSTRACT

The use of a polyamide including hydroxyaromatic units in order to increase the acid resistance of a polyamide composition is described. A polyamide composition comprising a polyamide that includes hydroxyaromatic units and use thereof for the manufacture of various plastic articles such as, for example, calibrated particles or injection-molded parts is also described. Such a composition is especially useful in the field of the recovery of slurries, liquids and gases present in underground reservoirs, and in particular in the field of the extraction of hydrocarbons, such as crude oil or natural gas.

16 Claims, No Drawings

POLYAMIDE COMPOSITION

This application is the United States national phase of PCT/EP2010/059271, filed Jun. 30, 2010, and designating the United States (published in the French language on Jan. 13, 2011, as WO 2011/003785 A1; the title and abstract were also published in English), which claims priority under 35 U.S.C. §119 of FR 0954755, filed Jul. 9, 2009, each hereby expressly incorporated by reference in its entirety and each assigned to the assignee hereof.

The present invention relates to the use of polyamide comprising hydroxyaromatic units to increase the resistance to acids of a polyamide composition. The invention also relates to a polyamide composition comprising a polyamide comprising hydroxyaromatic units and to its use in the manufacture of various plastic articles, such as, for example, graded particles or injection-molded components. Said composition is used in particular in the field of the recovery of sludges, liquids and gases present in underground reservoirs, and in particular in the field of the extraction of hydrocarbons, such as crude oil or natural gas.

PRIOR ART

Polyamide-based thermoplastic compositions are starting materials capable of being converted to plastic articles and components, in particular by various forming processes.

In a great many fields of activity, it may prove to be necessary to have available materials exhibiting high mechanical performance and strong resistance to chemicals and in particular acids. Mention may in particular be made, as application, of pipes and tanks in the motor vehicle field or various articles obtained by injection molding.

There also exists a need in the field of filtration (gravel packing) materials in the context of the extraction of hydrocarbons, such as crude oil or natural gas. This is because thermoplastic materials, in particular polyamide materials, in the form of graded particles, are introduced by pumping into underground reservoirs to act according to a filtration mechanism, in order to minimize the flow of fine particles of rock, sand and other impurities liable to be present in the reservoir into the sludges, liquids and gases which have to be extracted from the well. In point of fact, these filtration materials are cleaned by injection of acids or acid sludges, in particular of HCl and/or HF type.

However, in view of the temperatures and pressures exerted on the polyamide in some applications, in particular gravel packing technologies, it is difficult to find formulations, in particular based on conventional polyamides, which exhibit good resistance to acids and which make it possible to meet the specifications for this application in the context of the extraction of hydrocarbons.

INVENTION

The Applicant Company has discovered, entirely surprisingly, that the use of polyamide comprising hydroxyaromatic phenolic units in a polyamide-based composition makes it possible to very significantly increase the resistance to acids of said polyamide composition, in particular to formulations comprising HCl and/or HF.

The present invention thus relates to the use of a hydroxyaromatic compound for increasing the resistance to acids of a polyamide or a polyamide composition.

The present invention also relates to the use of polyamide comprising hydroxyaromatic units chemically bonded to the chain of the polyamide in order to increase the resistance to acids of a polyamide composition.

The present invention relates in particular to the use of a polyamide modified by a compound comprising at least one aromatic hydroxyl group and being chemically bonded to the polymer chain, the modified polyamide being obtained by polymerization, apart from the monomers of the polyamide, of a hydroxyaromatic compound or by melt blending a polyamide, partially or completely formed, with a hydroxyaromatic compound, in particular during a reactive extrusion. The modified polyamide according to the invention can also be obtained by solid-phase or solvent-phase polycondensation for some polyamides.

The monomers of the polyamides can in particular be diacid monomers, in particular aliphatic, cycloaliphatic, arylaliphatic or aromatic diacid monomers, diamine monomers, in particular aliphatic diamine monomers, and/or amino acids or lactams. These are generally the monomers conventionally used for the manufacture of semicrystalline polyamides, such as aliphatic polyamides, semiaromatic polyamides and more generally the linear polyamides obtained by polycondensation between a saturated aliphatic or aromatic diacid and a saturated aromatic or aliphatic primary diamine, the polyamides obtained by condensation of a lactam or of an amino acid or the linear polyamides obtained by condensation of a mixture of these various monomers. More specifically, these copolyamides can be, for example, poly(hexamethylene adipamide), the polyphthalamides obtained from terephthalic and/or isophthalic acid, or the copolyamides obtained from adipic acid, hexamethylenediamine and caprolactam.

The monomers of the polyamides can optionally comprise unsaturations or heteroatoms, such as oxygen, sulfur or nitrogen.

Use may in particular be made of the polyamides chosen from the group consisting of polyamide 6, polyamide 6.6, polyamide 6.10, polyamide 11, polyamide 12, polyamide 6.12, poly(m-xylylene adipamide) (MXD6), polyamide 6.6/6.T, polyamide 6.6/6.I, and the blends and copolyamides, such as copolyamide 6.6/6, for example. The composition of the invention can also comprise the copolyamides derived in particular from the above polyamides or the blends of these polyamides or copolyamides.

The preferred polyamides are poly(hexamethylene adipamide), polycaprolactam, or the copolymers and blends between poly(hexamethylene adipamide) and polycaprolactam.

The dicarboxylic acids can also be chosen from glutaric acid, adipic acid, pimellic acid, suberic acid, azelaic acid, sebacic acid, dodecanedioic acid, 1,2- or 1,3-cyclohexanedicarboxylic acid, 1,2- or 1,3-phenylene-diacetic acid, 1,2- or 1,3-cyclohexanediacetic acid, isophthalic acid, terephthalic acid, 4,4'-benzo-phenonedicarboxylic acid, 2,5-naphthalenedicarboxylic acid and p-(t-butyl)isophthalic acid. The preferred dicarboxylic acid is adipic acid.

The diamines can, for example, be chosen from hexamethylenediamine, butanediamine, pentanediamine, 2-methylpentamethylenediamine, 2-methylhexamethylenediamine, 3-methylhexamethylenediamine, 2,5-dimethyl-hexamethylenediamine, 2,2-dimethylpentamethylene-diamine, nonanediamine, decanediamine, 5-methyl-nonanediamine, dodecamethylenediamine, 2,2,4- and 2,4,4-trimethylhexamethylenediamine, 2,2,7,7-tetra-methyloctamethylenediamine, isophoronediamine, diamino-dicyclohexylmethane and $C_2$-$C_{16}$ aliphatic diamines which can be substituted by one or more alkyl groups. The preferred diamine is hexamethylenediamine.

The modified polyamide of the invention can be obtained from in particular a lactam monomer or an amino acid, preferably one which is aliphatic. Mention may be made, as examples of such lactams or amino acids, of caprolactam, 6-aminohexanoic acid, 5-aminopentanoic acid, 7-aminoheptanoic acid, 11-aminoundecanoic acid or dodecanolactam.

These polyamides can in particular be modified by difunctional or monofunctional monomers, such as, in particular, diacids or diamines or monoacids or monoamines. Polyfunctional molecules, at least trifunctional molecules, can also be used to introduce branchings into the polyamide. Mention will be made, for example, of bishexamethylenetriamine.

The hydroxyaromatic compound is a compound carrying at least one, in particular one or two, functional groups capable of reacting with the amine or acid functional groups of the polyamide or polyamide monomers.

The term "aromatic hydroxyl group" is understood to mean a hydroxyl functional group attached to a carbon atom forming part of an aromatic ring.

The term "hydroxyaromatic compound" is understood to mean an organic compound comprising at least one aromatic hydroxyl group.

The term "chemically bonded" is understood to mean bonded via a covalent bond. Once chemically bonded to the polyamide chain, the hydroxyaromatic compound becomes a hydroxyaromatic unit and the modified polyamide of the invention is a polyamide comprising hydroxyaromatic units.

The functional groups of the hydroxyaromatic compound which can react with the functional groups of the polyamide are in particular acid, ketone, amine and aldehyde functional groups.

The term "acid functional group" is understood to mean a carboxylic acid functional group or a functional group derived from a carboxylic acid functional group, such as acid chloride, acid anhydride, amide or ester.

The aromatic hydroxyl groups of the invention are not regarded as functional groups which react with acid functional groups.

Advantageously, the hydroxyl group of the monomer is not hindered, that is to say, for example, that the carbon atoms situated in the α position with respect to the hydroxyl functional group are preferably not substituted by bulky substituents, such as branched alkyls.

The hydroxyaromatic compound can, for example, be represented by the following formula (I):

$(HO)_x\text{—}Z\text{-}(F)_n$ (I)

in which:
Z is a polyvalent (at least divalent) aromatic or arylaliphatic hydrocarbon radical,
x is between 1 and 10,
F is an acid, aldehyde, amine or ketone functional group capable of becoming bonded to an acid or amine functional group of the monomers of the polyamide, and
n is between 1 and 5.

Z can, for example, be chosen from the group consisting of: benzene, methylbenzene, naphthalene, biphenyl, diphenyl ether, diphenyl sulfide, diphenyl sulfone, ditolyl ether, xylylene, diethylbenzene and pyridine.

The term "arylaliphatic radical" is understood to mean a radical according to which at least one functional group F of the compound of formula (I) is not attached to this radical via a carbon atom forming part of an aromatic ring.

Advantageously, Z comprises between 6 and 18 carbon atoms.

A hydroxyaromatic compound can certainly comprise several types of functional groups F which are different in nature.

This compound is preferably chosen from the group consisting of: 2-hydroxyterephthalic acid, 5-hydroxyisophthalic acid, 4-hydroxyisophthalic acid, 2,5-dihydroxyterephthalic acid, 4-hydroxyphenylacetic acid or gallic acid, 4-hydroxyphenylacetic acid, 3,5-diaminophenol, 5-hydroxy-m-xylylenediamine, 3-aminophenol, 3-amino-4-methylphenol and 3-hydroxy-5-aminobenzoic acid.

In the context of the invention, mixtures of different compounds of formula (I) can be employed.

The molar proportion of hydroxyaromatic compound, with respect to all the monomers forming the polyamide, for example the sum of the diacid, diamine and amino acid monomers and the hydroxyaromatic compound, is generally between 0.1 and 100%, preferably between 1 and 70%, more preferably between 0.5 and 60% and more preferably still between 2.5 and 50%.

The polyamide of the invention is obtained in particular by a process for the melt polymerization of the various monomers described above, these monomers being present in all or in part.

The expression "melt polymerization" is understood to mean that the polymerization is carried out in the liquid state and that the polymerization medium does not comprise a solvent other than water, optionally. The polymerization medium can, for example, be an aqueous solution comprising the monomers or a liquid comprising the monomers. Advantageously, the polymerization medium comprises water as solvent. This facilitates the stirring of the medium and thus its homogeneity. The polymerization medium can also comprise additives, such as chain-limiting agents. The modified polyamide of the invention is generally obtained by polycondensation between the various monomers, present in all or in part, in order to form polyamide chains, with formation of the elimination product, in particular water, a portion of which may be vaporized. The modified polyamide of the invention is generally obtained by heating, at high temperature and high pressure, for example an aqueous solution comprising the monomers or a liquid comprising the monomers, in order to evaporate the elimination product, in particular the water (present initially in the polymerization medium and/or formed during the polycondensation), while preventing any formation of solid phase in order to prevent the mixture from setting solid.

The polycondensation reaction is generally carried out at a pressure of approximately 0.5-3.5 MPa (0.5-2.5 MPa) at a temperature of approximately 100-320° C. (180-300° C.). The polycondensation is generally continued in the molten phase at atmospheric or reduced pressure, so as to achieve the desired degree of progression.

The polycondensation product is a molten polymer or prepolymer. It can comprise a vapor phase essentially composed of vapor of the elimination product, in particular of water, capable of having been formed and/or vaporized.

This product can be subjected to stages of separation of vapor phase and of finishing in order to achieve the desired degree of polycondensation. The separation of the vapor phase can, for example, be carried out in a device of cyclone type. Such devices are known.

The finishing consists in keeping the polycondensation product in the molten state, under a pressure in the vicinity of atmospheric pressure or under reduced pressure, for a time sufficient to achieve the desired degree of progression. Such an operation is known to a person skilled in the art. The temperature of the finishing stage is advantageously greater than or equal to 100° C. and in all cases greater than the temperature at which the polymer solidifies. The residence time in the finishing device is preferably greater than or equal to 5 minutes.

The polycondensation product can also be subjected to a solid-phase postcondensation stage. This stage is known to a person skilled in the art and makes it possible to increase the degree of polycondensation to a desired value.

The process of the invention is similar in its conditions to the conventional process for the preparation of polyamide of the type of those obtained from dicarboxylic acids and diamines, in particular to the process for the manufacture of polyamide 6.6 from adipic acid and hexamethylenediamine. This process for the manufacture of polyamide 6.6 is known to a person skilled in the art. The process for the manufacture of polyamide of the type of those obtained from dicarboxylic acids and diamines generally uses, as starting material, a salt obtained by mixing a diacid with a diamine in a stoichiometric amount, generally in a solvent, such as water. Thus, in the manufacture of poly(hexamethylene adipamide), the adipic acid is mixed with hexamethylenediamine, generally in water, in order to obtain hexamethylenediammonium adipate, better known under the name of Nylon salt or "N Salt".

Thus, when the process of the invention employs a diacid and a diamine, these compounds can be introduced, at least in part, in the form of a salt. In particular, when the diacid is adipic acid and the diamine is hexamethylenediamine, these compounds can be introduced, at least in part, in the N salt form. This makes it possible to have a stoichiometric equilibrium. Likewise, when the hydroxyaromatic compound is a diacid or a diamine, it is also possible to introduce it in the form of salts with a diamine or a diacid.

The process of the invention generally results in a random polymer when the hydroxyaromatic compound is polyfunctional, in particular at least difunctional, and in a polyamide having partially or completely hydroxyaromatic endings, when the hydroxyaromatic compound is monofunctional.

The modified polyamide obtained at the end of the finishing stage can be cooled and formed into granules.

The modified polyamide obtained by the process of the invention in the molten form can be directly formed or can be extruded and granulated for subsequent forming after melting.

The modified polyamide of the invention exhibits the advantage of being easy to convert by the molten route, like aliphatic polyamides, for example, which facilitates the forming thereof. Furthermore, it exhibits improved thermomechanical properties; for example, they exhibit a higher glass transition temperature than aliphatic polyamides. Finally, they show better water uptake properties in comparison with aliphatic polyamides.

In order to improve the mechanical properties of a polyamide composition according to the invention, it may be advantageous to add to it at least one reinforcing and/or bulking filler, such as fibrous or nonfibrous fillers, preferably chosen from the group consisting of glass fibers, carbon fibers, aramid fibers, clays, kaolin, mica, wollastonite, silica, talc, graphite, silicon carbide or nanoparticles. The degree of incorporation of reinforcing and/or bulking filler is in accordance with the standards in the field of composite materials. The content of filler may, for example, be from 1 to 80%, preferably from 10 to 70% and in particular between 20 to 60%.

For the gravel packing application, preference is given in particular to fillers known for their resistance to acids, such as graphite and silicon carbide.

Use may be made, for example, of a polyamide composition comprising from 70 to 90% by weight of a polyamide comprising from 1 to 70 mol % of hydroxyaromatic units and from 10 to 30% by weight of graphite or silicon carbide, with respect to the total weight of the composition.

The composition according to the invention can additionally comprise additives normally used in the manufacture of polyamide compositions intended to be molded. Thus, mention may be made of lubricants, flame retardants, plasticizers, nucleating agents, catalysts, agents for improving the impact strength, such as optionally grafted elastomers, light and/or heat stabilizers, antioxidants, antistatic agents, dyes, pigments, matifying agents, molding aids or other conventional additives.

For the preparation of a polyamide composition, these fillers and additives can be added to the modified polyamide by normal means suited to each filler or additive, such as, for example, during the polymerization or as a melt blend.

It is perfectly possible to blend the modified polyamide as described above with another thermoplastic polymer, in particular a polyamide, polyolefin, ABS or polyester, so as to produce blends.

In a specific case of the invention, a polyamide comprising hydroxyaromatic units can be added to a polyamide by the molten route, in particular during a stage of extrusion of the polyamide, or by the solid route in a mechanical mixer; it being possible for the solid blend to be subsequently melted, for example by an extrusion process.

The polyamide comprising hydroxyaromatic units can also be used as additive, in particular in order to confer certain properties, in particular rheological properties, in compositions comprising a thermoplastic polymer, in particular a (co)polyamide, as matrix. The invention thus relates to a process for the manufacture of a composition in which a polyamide composition comprising a polyamide comprising hydroxyaromatic units is blended, under cold conditions or molten, with a thermoplastic composition, in particular a composition based on (co)polyamide. The blend produced under cold conditions can subsequently be melted, for example by an extrusion process.

The polyamide composition comprising a polyamide comprising hydroxyaromatic units can also comprise a high proportion of additives and can, for example, be used as masterbatch intended to be blended with another thermoplastic composition, in particular a polyamide-based composition.

The compositions according to the invention can be used as starting material in the field of engineering plastics, for example in the preparation of articles obtained by injection molding, by injection/blowing molding, by extrusion or by extrusion/blowing molding. According to a standard embodiment, the modified polyamide is extruded in the form of rods, for example in a twin-screw extrusion device, which are subsequently cut up into granules. The molded components are subsequently produced by melting the granules produced above and feeding the composition, in the molten state, to injection molding devices.

Mention may be made, as articles according to the invention, of pipes, tanks and containers, such as cooling pipes, cooling water housings, engine air guiding hoses or hoses for the oil circuit.

According to another aspect, the polyamide composition of the invention can also be used as filter (gravel pack) in the field of the recovery of sludges, liquids and gases present in underground reservoirs and in particular in the field of the extraction of hydrocarbons, such as crude oil or natural gas. To this end, the composition of the invention, advantageously in the form of graded particles of variable sizes and shapes, is introduced by pumping into the underground reservoir to act according to a filtration mechanism, in order to minimize the flow of fine particles of rock, sand and other impurities liable to be present in the reservoir into the sludges, liquids and gases which have to be extracted from the well. Such a gravel packing operation requires from several hundred to several thousand kg, for example from approximately 0.5 ton to approximately 5 tons, of material according to the invention. Use may in particular be made, for this application, of graded particles, such as granules, beads and/or flattened or nonflattened cylinders, exhibiting a mean particle size (D50) of between 0.2 and 2 mm, preferably of between 0.5 and 1.5 mm, in particular according to the standard ISO 13320-1.

A specific language is used in the description so as to facilitate understanding of the principle of the invention. Nevertheless, it should be understood that no limitation on the scope of the invention is envisaged by the use of this specific language. Modifications and improvements can in particular be envisaged by a person conversant with the technical field concerned on the basis of his own general knowledge.

The term and/or includes the meanings and, or and all the other possible combinations of the elements connected to this term.

Other details or advantages of the invention will become more clearly apparent in the light of the examples given below purely by way of indication.

EXPERIMENTAL PART

Contents of acid end groups (CEG) and amine end groups (AEG): assayed by potentiometry, expressed in meq/kg. The contents of phenol end groups PEG (for the monofunctional hydroxyaromatic compounds) are determined from the starting amounts of reactants introduced into the synthesis reactor.

Number-average molar mass determined by the formula $Mn=2\times10^6/(AEG+CEG+PEG)$ and expressed in g/mol.

Melting point (M.p.) and associated enthalpy ($\Delta$Hf), crystallization temperature on cooling (Tc): determined by differential scanning calorimetry (DSC) using a Perkin Elmer Pyris 1 device, at a rate of 10° C./min.

Glass transition temperature (Tg) determined on the same device at a rate of 40° C./min.

Example 1

Preparation of a Copolyamide PA 6.6/6.HIA, 95/5 Molar or 94.2/5.8 by Weight 87.3 kg (332.8 mol) of N salt (1:1 salt of hexamethylenediamine and adipic acid), 3219 g of 99.5% 5-hydroxyisophthalic acid (HIA) (17.5 mol), 6276 g of a 32.4% by weight solution of hexamethylenediamine (HMD) in water (17.5 mol), 81.2 kg of demineralized water and 6.4 g of antifoaming agent Silcolapse 5020® are introduced into a polymerization reactor.

The copolyamide is manufactured according to a standard polymerization process of polyamide 6.6 type, with finishing for 35 minutes.

The polymer obtained is cast in the rod form, cooled and formed into granules by cutting the rods.

The polymer obtained exhibits the following characteristics: CEG=78.4 meq/kg, AEG=57.6 meq/kg, Mn=14700 g/mol.

The copolyamide is semicrystalline and has the following thermal characteristics:

Tg=76.8° C., Tc=218.4° C., M.p.=256.2° C., $\Delta$Hf=62.5 J/g. The copolyamide has a Tg which is greater by 6.2° C. with respect to that of PA 6.6.

Example 2

Preparation of a Copolyamide PA 6.6/6.HIA, 85/15 Molar or 83/17 by Weight 76.9 kg (293.1 mol) of N salt (1:1 salt of hexamethylenediamine and adipic acid), 9462 g of 99.5% 5-hydroxyisophthalic acid (HIA) (51.7 mol), 18624 g of a 32.25% by weight solution of hexamethylenediamine (HMD) in water (51.7 mol), 72.6 kg of demineralized water and 6.4 g of antifoaming agent Silcolapse 5020® are introduced into a polymerization reactor.

The copolyamide is manufactured according to a standard polymerization process of polyamide 6.6 type, with finishing for 35 minutes.

The polymer obtained is cast in the rod form, cooled and formed into granules by cutting the rods.

The polymer obtained exhibits the following characteristics: CEG=82.7 meq/kg, AEG=61.5 meq/kg, Mn=13870 g/mol.

The copolyamide is semicrystalline and has the following thermal characteristics:

Tg=85.8° C., Tc=186.2° C., M.p.=240.4° C., $\Delta$Hf=41.9 J/g. The copolyamide has a Tg greater by 15.2° C. with respect to that of PA 6.6.

Example 3

Preparation of a Polyamide PA 6.HIA and of a Blend PA 6.6.PA 6.HIA, 85/15 by Weight A 51% by weight 6.HIA salt in water is produced by mixing a stoichiometric amount of hexamethylenediamine and 5-hydroxyisophthalic acid in water. 5623 g of 51% 6.HIA salt, 112.1 g of 99.5% 5-hydroxyisophthalic acid, 105 g of water and 3.3 g of antifoaming agent are subsequently introduced into a polymerization reactor.

The polyamide PA 6.HIA is manufactured according to a standard polymerization process of polyamide 6.6 type, with finishing for 30 minutes. The polymer obtained is cast in the rod form, cooled and formed into granules by cutting the rods. The polymer obtained is amorphous and exhibits a glass transition temperature of Tg=166.6° C.

The PA 6.6 and the PA 6.HIA thus prepared are blended in a proportion of 85/15 by weight by the molten route in a DSM MIDI 2000 microextruder (microcompounder) (15 cm³) at a temperature of 275° C.

Example 4

Preparation of a Polyamide PA 6.6 Phenol-Functionalized by a Monoacid-Phenol 135.2 g of N salt (0.52 mol), 9.41 g of 98% 4-hydroxyphenylacetic acid (0.06 mol), 10.87 g of a 32.4% aqueous solution of hexamethylenediamine (0.03 mol), 127.2 g of demineralized water and 2 g of an antifoaming agent are introduced into a polymerization reactor.

The polyamide is manufactured according to a standard polymerization process of polyamide 6.6 type with finishing for 30 minutes.

The polymer obtained is cast in the rod form, cooled and formed into granules by cutting the rods.

The polymer obtained exhibits the following characteristics:

CEG=103.3 meq/kg, AEG=29.4 meq/kg. The theoretical amount of phenol functional groups at the chain end, PEG, is calculated from the starting amounts introduced into the reactor. PEG=437 meq/kg. Mn=2×10⁶/(AEG+CEG+PEG)=3510 g/mol.

The polyamide PA 6.6 phenol-functionalized by 4-hydroxyphenylacetic acid is semicrystalline and has the following thermal characteristics: Tc=231.9° C., M.p.=259° C., ΔHf=81.5 J/g.

Example 5

Evaluation of the Resistance to Acids

The tests presented below are inspired by the API (American Petroleum Institute) standard RP 58.
Procedure
Preparation of the Samples
1) Granules formed of polyamide comprising hydroxyaromatic units are prepared either by synthesizing in a polycondensation reactor, followed by extruding and granulating (examples 1, 2 and 4) or by melt blending, in a twin-screw extruder, a polyamide 6.6 and variable proportions of a polyamide comprising hydroxyaromatic units, followed by granulating (example 3).
2) 15 g of beads (obtained by underwater pelletizing) or granules (resulting from the preceding part) are placed in a crystallizing dish. Said beads or granules are dried in an oven for 48 h under vacuum while flushing with nitrogen at 80° C. The beads or granules are recovered and placed in a desiccator in order for them to return to ambient temperature. The water content of the polymer $w_{water}$ is then measured by a Karl Fischer apparatus.
Test 65° C. 30 Minutes in 15% HCl
5 g of test sample are weighed out with a Mettler AE 240 precision balance (confirmed accuracy of $3×10^{-3}$ g). The starting weight $w_{polymer}^{\circ}$ is thus obtained. The sample is placed in a 250 ml flat-bottomed reactor. 100 ml of 15% hydrochloric acid solution (solution prepared by diluting a 30% hydrochloric acid solution) are added. The measurement cylinder used exhibits an accuracy of +/−1.0 ml at 20° C. The reactor is closed. The test is carried out without stirring. Gentle nitrogen flushing is applied (confirmation by virtue of the bubbler at the inlet and at the outlet of the reactor). The reactor is immersed in an oil bath at 65° C. and the stopwatch is started when the reactor is immersed. The test lasts 30 min.
At the end of the test, the reactor is dismantled and the solution is filtered through a pleated filter paper. Rinsing is carried out with demineralized water and the pH is measured.
The filtered substance is recovered and placed in a beaker. 200 ml of demineralized water are added with a magnetic stirrer and the beaker is placed on a stirrer plate for one hour. The pH is then confirmed with pH paper in order to monitor the change in the HCl concentration. The washing is performed a further two times, the pH of each end of washing being recorded.
At the end of the washing operations, the substance is recovered in an aluminum capsule. The substance is left overnight in a ventilated fume cupboard. Finally, the filter paper is weighed.
The substance is dried in an oven for 48 h under vacuum while flushing with nitrogen at 80° C. The substance is then placed in a desiccator in order for it to return to ambient temperature. The substance is weighed and the final weight $w_{polymer}^{f}$ is thus obtained.
Comment: The chlorides were assayed after the test on several samples. Approximately less than 0.1% of Cl⁻ remains in the sample. Assaying of water indicates a water content of approximately 0.2% after the acid test.

Expression of the Results
The loss in weight (LW) in % is measured by the following relationship:

$$LW=[(w_{polymer}^{\circ}-w_{polymer}^{f})/w_{polymer}^{\circ}]*100\pm0.5\%$$

By way of comparison, use is made of a reference PA 6.6 characterized by CEG=77.2 meq/kg and AEG=43.5 meq/kg, i.e. an Mn=16570 g/mol. A loss in weight of 13.70% is observed with a composition comprising a polyamide 6.6: the objects (granules or powder) are strongly attacked and a sort of paste is obtained at the end.

In the case of the products produced according to the composition of example 1 (PA 6.6/6.HIA with a 95/5 composition), no loss in weight is obtained (measurement+/−0.5%): the objects (granules or powder) remain completely integral and no attack can be detected.

In the case of the products produced according to the composition of example 2 (PA 6.6/6.HIA with a 85/15 composition), no loss in weight is obtained (measurement+/−0.01%): the objects (granules or powder) remain completely integral and no attack can be detected.

The invention claimed is:

1. A method of recovering sludge, liquid or gas from an underground reservoir, said method comprising introducing a polyamide or polyamide composition having increased resistance to acids into an underground reservoir, said polyamide comprising hydroxyaromatic units and said polyamide composition comprising a polyamide comprising hydroxyaromatic units, wherein said hydroxyaromatic units are chemically bonded to the chain of the polyamide.

2. The method as claimed in claim 1, wherein the hydroxyaromatic units are chemically bonded to the chain of the polyamide by polymerization or by melt blending.

3. The method as claimed in claim 1, wherein the polyamide is selected from the group consisting of polyamide 6, polyamide 6.6, polyamide 6.10, polyimide 11, polyimide 12, polyamide 6.12, poly(m-xylylene adipamide), polyamide 6.6/6.T, polyamide 6.6/6.I, and blends and copolyamides thereof.

4. The method as claimed in claim 1, wherein the hydroxyaromatic compound exhibits at least one functional group capable of reacting with functional groups of the polyamide or of monomers of the polyamide.

5. The method as claimed in claim 1, wherein the hydroxyaromatic compound is represented by the following formula (I):

$$(HO)_x-Z-(F)_n \quad \quad (I)$$

in which:
Z is a polyvalent aromatic or arylaliphatic hydrocarbon radical,
x is between 1 and 10,
F is an acid, aldehyde, amine or ketone functional group capable of becoming bonded to an acid or amine functional group of the monomers of the polyamide, and
n is between 1 and 5.

6. The method as claimed in claim 5, wherein Z is a polyvalent radical selected from the group consisting of: benzene, methylbenzene, naphthalene, biphenyl, diphenyl ether, diphenyl sulfide, diphenyl sulfone, ditolyl ether, xylylene, diethylbenzene and pyridine.

7. The method as claimed in claim 1, wherein the hydroxyaromatic compound is selected from the group consisting of: 2-hydroxyterephthalic acid, 5-hydroxyisophthalic acid, 4-hydroxyisophthalic acid, 2,5-dihydroxyterephthalic acid, 4-hydroxyphenylacetic acid or gallic acid, 4-hydroxyphenylacetic acid, 3,5-diaminophenol, 5-hydroxy-m-xylylenediamine, 3-aminophenol, 3-amino-4-methylphenol and 3-hydroxy-5-aminobenzoic acid.

8. The method as claimed in claim 1, wherein the molar proportion of hydroxyaromatic compound, with respect to all the monomers forming the polyamide, is between 0.1% and 100%.

9. The method as claimed in claim 1, wherein the polyamide composition comprises at least one reinforcing and/or bulking filler selected from the group consisting of glass fibers, carbon fibers, aramid fibers, clays, kaolin, mica, wollastonite, silica, talc, graphite, silicon carbide and nanoparticles.

10. The method as claimed in claim 1, wherein the polyamide composition is used as a filter for recovery of sludge, liquid or gas present in underground reservoirs.

11. The method as claimed in claim 1, wherein said polyamide or polyamide composition is used under the form of a graded particle, exhibiting a mean particle size (D50) of between 0.2 mm and 2 mm.

12. The method as claimed in claim 8, wherein the molar proportion of hydroxyaromatic compound is between 1% and 70%.

13. The method as claimed in claim 8, wherein the molar proportion of hydroxyaromatic compound is between 0.5% and 60%.

14. The method as claimed in claim 8, wherein the molar proportion of the hydroxyaromatic compound is between 2.5% and 50%.

15. The method as claimed in claim 10, wherein the filter is used for extraction of hydrocarbons.

16. The method as claimed in claim 15, wherein the hydrocarbons are crude oil or natural gas.

* * * * *